United States Patent [19]

Popeney

[11] 4,387,840
[45] Jun. 14, 1983

[54] VEHICLE WITH IMPROVED LUGGAGE AND RACK ASSEMBLY

[76] Inventor: Harry V. Popeney, 18136-45 Oxnard St., Tarzana, Calif. 91356

[21] Appl. No.: 329,288

[22] Filed: Dec. 10, 1981

[51] Int. Cl.³ .............................................. B60R 9/04
[52] U.S. Cl. .................................. 224/314; 224/319; 224/324; 224/325; 248/154; 280/769
[58] Field of Search ........... 280/289 A, 769; 190/18 A; 224/309, 315, 317, 323–326, 319, 328, 310, 314; 248/154, 346, 500, 507; 211/104, 132

[56] References Cited

U.S. PATENT DOCUMENTS

| 2,289,695 | 7/1942 | Bryant | 248/154 X |
| 3,542,264 | 11/1970 | Meyer | 224/326 X |
| 4,340,132 | 7/1982 | Cerna | 190/18 A |
| 4,358,037 | 11/1982 | Heideman | 224/324 X |

FOREIGN PATENT DOCUMENTS

| 2703719 | 8/1978 | Fed. Rep. of Germany | 224/328 |
| 2487273 | 1/1982 | France | 224/315 |
| 1306216 | 2/1973 | United Kingdom | 224/324 |

Primary Examiner—William Price
Assistant Examiner—Gary E. Elkins
Attorney, Agent, or Firm—John J. Posta, Jr.

[57] ABSTRACT

A vehicle is provided which has improved luggage and rack assembly. Upon a flat surface of the vehicle, such as a trunk lid or roof, is mounted a luggage retainer sub assembly. The sub assembly includes a spaced parallel pair of substantially horizontal rails secured to and running across the upper surface of the vehicle top or trunk lid, and a first end plate disposed between and hinged to one end of the pair of rails and movable between a collapsed storage position between the rails and an operative about vertical luggage support position. The sub assembly also includes a second end plate hinged to the opposite end of the rails, comprising two hinged sections and movable between a collapsed position between the rails and an operative position in which one section is above vertical and the other section is parallel to and above the rails. Thus, a luggage space is defined into which male inserts from the two plates project. An item of luggage is releasably secured to the sub assembly through a groove receiving the pair of rails and female recesses receiving the male inserts. Preferably, the assembly includes a second sub assembly spaced from and parallel to the first sub assembly, and a second groove in the luggage as well as recesses to receive the additional male inserts. Thus, the luggage can be easily and securely locked into place on the vehicle.

8 Claims, 5 Drawing Figures

VEHICLE WITH IMPROVED LUGGAGE AND RACK ASSEMBLY

BACKGROUND OF THE INVENTION

1. Field of the Invention

The present invention generally relates to luggage carrying means and more particularly to a vehicle containing an improved luggage rack and luggage releasably engaged therewith.

2. Prior Art

Certain conventional vehicle luggage racks comprise a pair of spaced raised rails secured lengthwise on the roof of the vehicle, between which luggage may be disposed. Straps, ropes or the like are then wound around the rails and over the luggage to hold it in place. The result is unsightly and the luggage is easily removable by vandals and just as easily is subject to sliding off the roof.

A second type of luggage carrying means in the form of a large plastic container or bubble with rack has been employed but is relatively expensive to purchase and install. Moreover, it has limited storage space and in some instances provides considerable wind resistance. In addition, it usually is not very attractive, but ordinarily is permanently mounted in place and thus cannot easily be removed when not in use.

Accordingly, there is a need for a low profile, attractive, inexpensive and durable luggage rack which can hold luggage easily and securely in place and cannot be tampered with. The rack components should preferably fold down when not in use and the overall appearance should be neat.

SUMMARY OF THE INVENTION

The vehicle containing the improved luggage assembly of the present invention satisfies the foregoing needs. Thus, the vehicle has the components substantially as set forth in the Abstract above. The vehicle has a generally flat, horizontal luggage supporting roof or truck portion, to the top surface of which is secured an improved sub assembly. The sub assembly comprising a pair of spaced, parallel horizontal rails secured to the roof or trunk, to which rails are hinged a pair of plates disposed between the rails at opposite ends thereof. Both plates are movable between a flat horizontal storage position and an about vertical luggage supporting position. One of the plates also includes a hinged end which can be placed in a horizontal position parallel to and above the rails. The plates have male inserts protruding into the space defined by the raised plates and rails.

An item of customized luggage is also provided in the assembly, which luggage is releasably disposed in the described space. Thus, the luggage has a groove to receive the pair of rails and also has female recesses to receive the male inserts. One or more sets of male inserts and female recesses may include a lock to secure the luggage to the rack.

Preferably, a second identical sub assembly spaced from and parallel to the first sub assembly is provided so that the luggage is secured by both sub assemblies. The luggage is thus securely held by the rack formed of the two sub assemblies and cannot be jarred loose. Moreover, when the luggage is removed from the rack, the plates can be collapsed to a position between the rails and releasably held therein, as by spring biased ball locks or the like. Further features of the invention are as set forth in the following detailed description and accompanying drawings.

DETAILED DESCRIPTION OF THE PREFERRED EMBODIMENT

Figure 1:
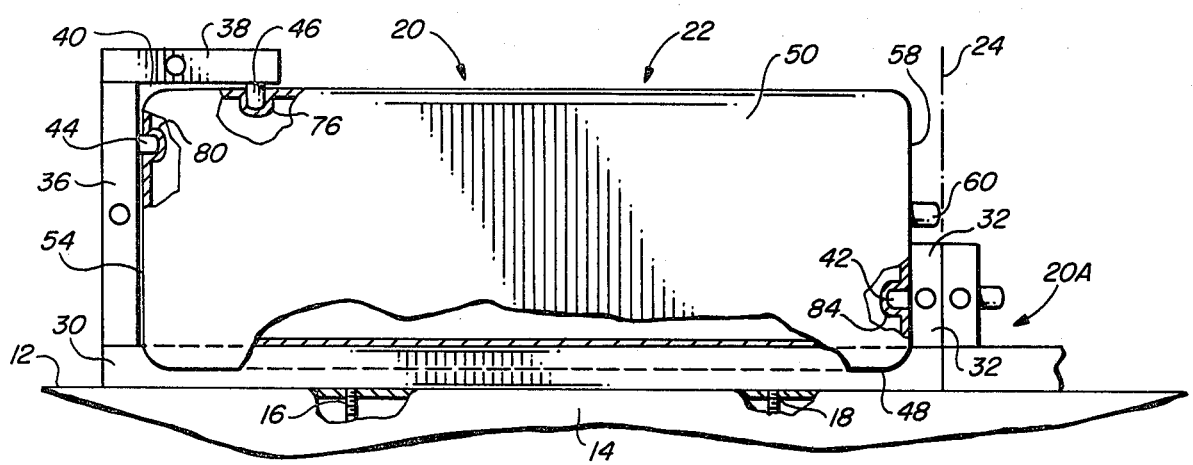
FIG. 1 is a fragmentary schematic side elevation, partly broken away, of a vehicle containing the improved assembly of the present invention, including a novel rack sub assembly shown secured to an upper surface of the vehicle, and a customized item of luggage releasably secured and locked therein.
Figure 2:
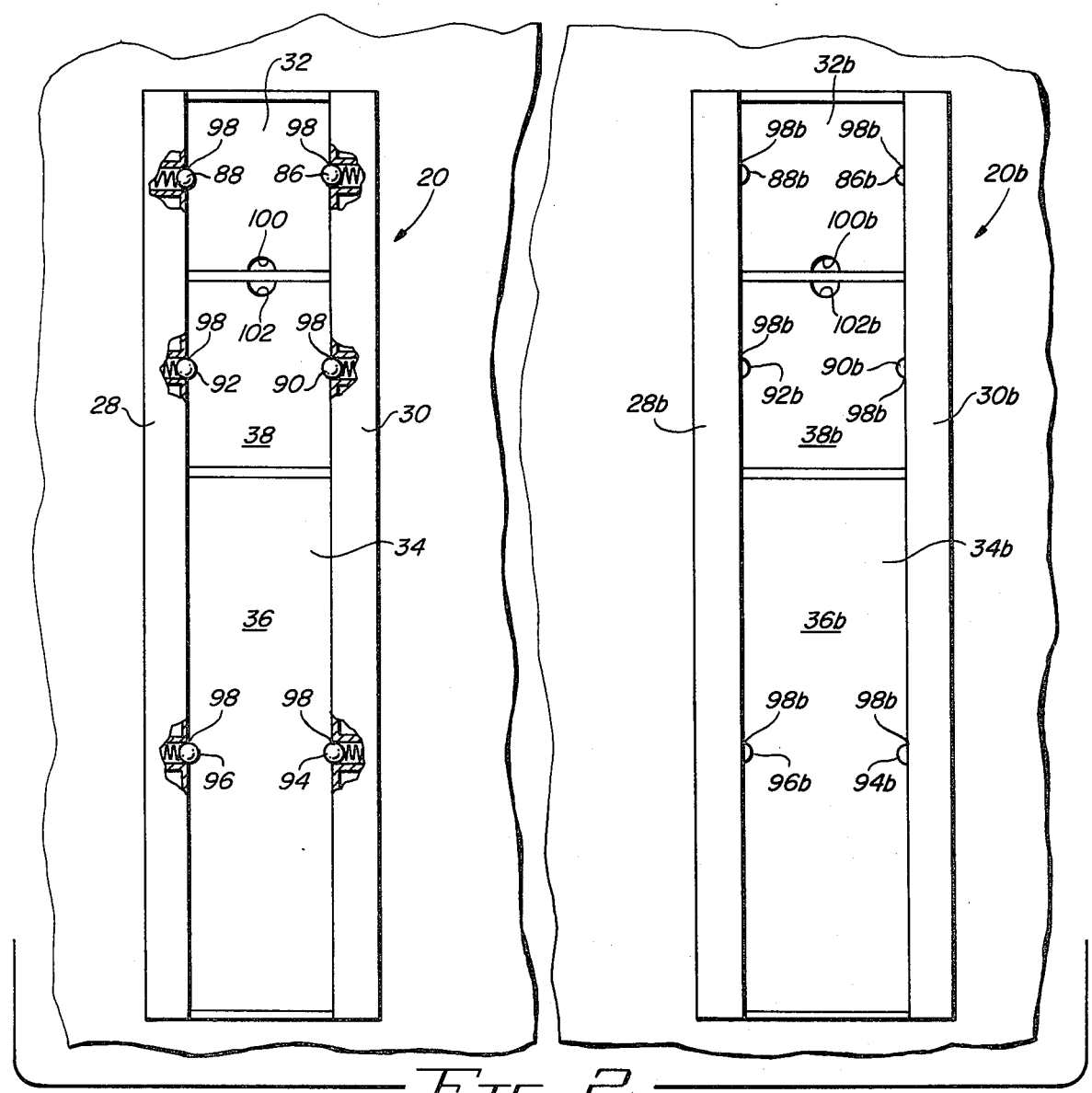
FIG. 2 is a schematic top plan view, broken away of the assembly of the present invention comprising a pair of luggage rack sub assemblies, including the one of FIG. 1 installed on the vehicle of FIG. 1, but in the collapsed storage position, with the luggage of FIG. 1 removed.
Figure 3:
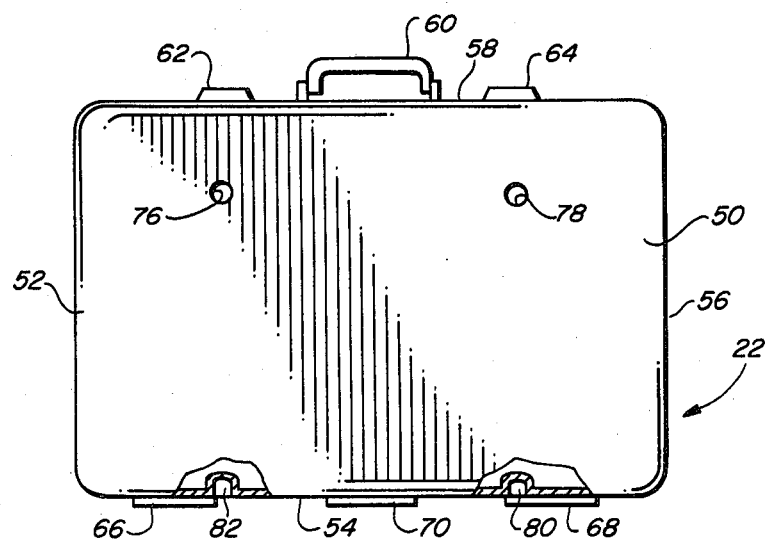
FIG. 3 is a schematic top plan view of the customized luggage of FIG. 1.
Figure 4:
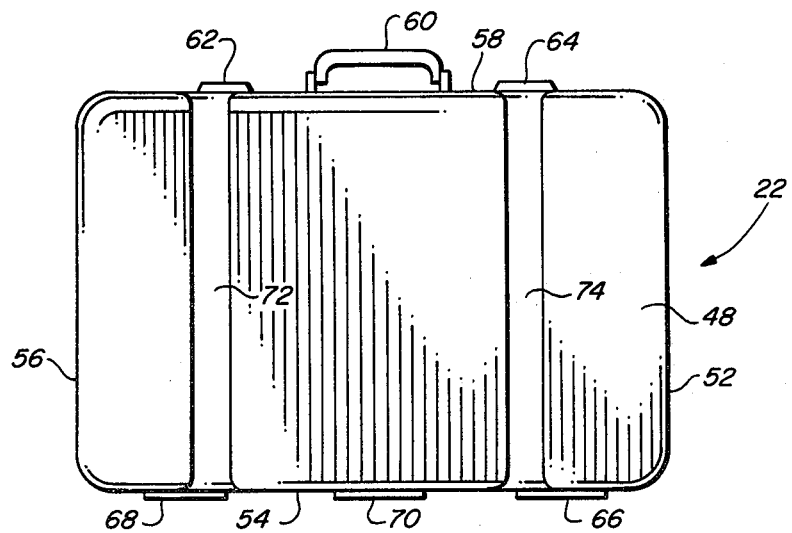
FIG. 4 is a schematic bottom plan view of the customized luggage of FIG. 3.
Figure 5:
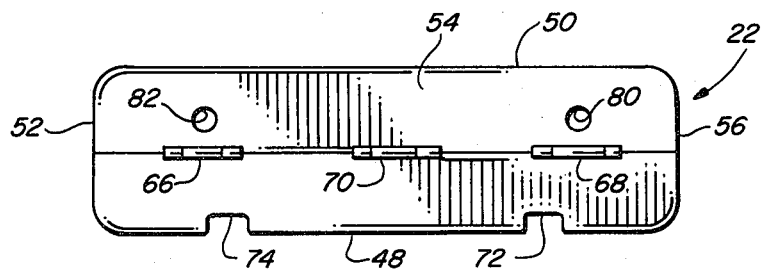
FIG. 5 is a schematic end view of the customized luggage of FIG. 3.

FIGS. 1 and 2

Now referring more particularly to FIG. 1 of the accompanying drawings, a preferred embodiment of the invention is shown. Thus, FIG. 1 depicts one of the improved luggage rack sub assemblies and luggage mounted on the vehicle in accordance with the present invention is schematically depicted therein. A portion of the roof 12 of a vehicle 14 is shown which has mounted thereon, as by screws 16 and 18, an improved luggage rack sub assembly 20 containing a customized item of luggage 22. Sub assembly 20 is mounted across the roof 12 up to the longitudinal mid-line 24 thereof. A portion of a second identical rack sub assembly 20a is shown mounted on roof 12 on the other side of the mid line 24 so that it abuts sub assembly 20 at said mid line 24. Moreover, another rack sub assembly 20b identical to sub assembly 20 is mounted parallel to and spaced from sub assembly 20 across roof 12, as shown in FIG. 2.

Sub assembly 20 comprises a pair of spaced parallel raised rails 28 and 30 (FIG. 2). A pair of plates 32 and 34 are disposed between and hinged to opposite end of rails 28 and 30. Plate 32 is movable between the collapsed horizontal storage position shown in FIG. 2 and the upright about vertical luggage supporting position in FIG. 1.

Plate 34 comprises a first elongated section 36 hinged to one end of rails 28 and 30 and a second shortened section 38 hinged to the free end of section 36. Sections 36 and 38 in the collapsed stored position of FIG. 2 lie between rails 28 and 30 and are horizontal. Section 36 in the operative luggage supporting position is about vertical (FIG. 1) while section 38 is horizontal and overlies rails 28 and 30 and is parallel thereto.

Rails 28 and 30, and plates 32 and 34 in the operative position of FIG. 1 define a space 40 therebetween. Into space 40 projects male members, specifically member 42 from plate 32, member 44 from section 36 and male locking member 46 from section 38, all as shown in FIG. 1. Sub assembly 20b is identical to sub assembly 20 and components thereof are identically labelled in FIG. 2, but are succeeded by the letter "b".

Customized item of luggage 22 comprises interconnected bottom 48, top 50 and sidewalls 52, 54, 56 and 58 defining a storage space (not shown). Luggage 22 also includes a handle 60, locks 62 and 64 and hinges 66, 68 and 70.

Luggage 22 further includes a pair of grooves 72 and 74, groove 72 being adopted to receive rails 28 and 30 and groove 74 being adopted to receive rails 28b and 30b.

Female recesses are disposed in top 50, (locking recesses 76 and 78) sidewall 54 (recesses 80 and 82) and sidewall 58 (recess 84 and a similar recess (not shown)) to receive, respectively, from sub assembly 20 male locking member 46, male member 44 and male member 42, as well as identical male members (not shown) from sub assembly 20b.

Thus, luggage 22 is initially seated on rails 28 and 30 and on rails 28b and 30b with sections 38 and 38b about vertical and sections 36 and 36b preferably having enough hinge play to allow them to be swung past vertical to permit luggage 22 to clear the described male members and seat them in the respective female recesses. Then, sections 38 and 38b are swung into the horizontal position shown for section 38 in FIG. 1 in order to engage legal locking member 46 and its counterpart (not shown) in sub assembly 20b into respectively, locking recesses 76 and 78 in top 50 so as to secure luggage firmly in place on roof 12 of vehicle 14 for transportation and safekeeping.

When luggage 22 is to be released from the described rack, the keyed locking member 46 and its counterpart are unlocked from recesses 76 and 78. Then sections 38 and 38b are swung to the vertical position, so that sections 36 and 36b can be backed off from luggage 22 to withdraw male member 44, its counterpart from recesses 80 and 82.

This permits luggage 22 to be shifted to withdraw male member 42 and its counterpart from recess 84 and its counterpart and thus free luggage 22 for removal from rails 28 and 30 and rails 28b and 30b.

Sections 36, 36b and 38, 38b and plate 32 and 32b can then be placed flat down within the respective sets of rails, as shown in FIG. 2 and releasably held therein by engagement of spring biased ball locks 86, 86b 88, 88b 90, 90b,92, 92b, 94, 94b, 96 and 96b in curved recesses generally designated 98 and 98b in plates 32, 32b 34 and 34b. Finger stalls 100, 100b, 102 and 102b are provided in plates 32, 32b 34 and 34b for lifting the respective plates to release them from the ball locks when the rack is ready for reuse.

In the stored position plates 32, 32b 34 and 34b are totally flat and out of the way, offering no wind resistance. Rails 28, 30 28b and 30b are preferably of low profile, e.g., 1 each about 1-2 inches high, 1 inch wide and about 18 inches long (along other suitable, width, length and heighth). Plates 32 and 32b may be, for example, about 2 inches wide, ½ inch thick and 4 inches long. Sections 38 and 38b may be of similar size while sections 36 and 36b preferably are of similar width and thickness but about 10 inches long. Again, these dimensions can vary, as desired. Plates 32, 32b, 34 and 34b and rails 28, 30, 28b and 30b preferably are of stainless steel or the like and the various male members preferably are steel pins with rounded exposed ends.

Thus, sub assemblies 20 and 20b can be made relatively inexpensively and durably with an attractive appearance. So also can luggage 22. They can be used, if desired, with other railing and ancillary equipment (not shown). The simple yet effective design provided herein permits luggage 22 to be safely carried locked in place on vehicle 14 and yet easily and quickly removed therefrom. When not in use sub assemblies 20 and 20b are almost flat, out of the way and offer minimal wind resistance. Other features are as set forth in the foregoing.

Various modifications, changes, alterations and additions can be made in the improved assembly of the present invention, its components and their parameters. All such changes, modifications, alterations and additions as are within the scope of the appended claims form part of the present invention.

What is claimed is:

1. A vehicle with an improved luggage and rack assembly, said vehicle comprising, in combination:
    (a) a vehicle having a generally flat horizontal luggage support portion;
    (b) a luggage retainer sub assembly, said sub assembly comprising
        i. a spaced parallel pair of substantially horizontal rails secured to the upper surface of said luggage support portion,
        ii. a first end plate disposed between and hinged to one end of said pair of rails, and movable between an operative, about vertical, luggage support position and a collapsed stored position between said rails,
        iii. a second end plate disposed between and hinged to the opposite end of said pair of rails and including a first section movable between a collapsed stored position between said rails and an operative, about vertical, luggage support position, and a second section hinged by connecting to the free end of said first section and movable between a collapsed stored position between said rails and an operative, about horizontal, luggage support position spaced above said rails and about perpendicular to said first section, said first and second plates defining a space therebetween and including detents facing said space; and,
    c. an item of luggage having a top, bottom and sides disposed in said space and defining a hollow closed interior, said bottom including a groove releasably receiving said pair of rails, and said top and two opposite sides defining recesses releasably receiving said detents, whereby said luggage is releasably secured in said assembly.

2. The improved assembly of claim 1 wherein said detents comprise male members and said recesses comprise female members, and wherein said rails are disposed across said upper surface.

3. The improved assembly of claim 2 wherein said second section of said second end plate overlies said luggage and releasably locks said luggage in place in said assembly.

4. The improved assembly of claim 3 wherein said assembly includes a spaced parallel plurality of said sub assemblies and wherein said luggage bottom includes a spaced plurality of said grooves to receive said rail pairs and said top and sides include a plurality of said recesses to receive said plurality of detents.

5. The improved assembly of claim 1 wherein the adjacent sides of said end plates and rails include releasable locking means to releasably lock said end plates in said collapsed stored position.

6. The improved assembly of claim 1 wherein said first section of said second plate, after pivoting of said second section of said second plate up away from said luggage, can be rotated past the about vertical position and away from said luggage to facilitate withdrawal of said detents from said recesses and removal of said luggage from said sub assembly.

7. The improved assembly of claim 5 wherein said releasable locking means include spaced alignable spring biased ball locks and ball recesses and wherein said first and second plates include lift means to permit unlocking of said plates from said rails.

8. The improved assembly of claim 7 wherein at least one of said sets of male members includes a lock mechanism to prevent removal of said luggage.

* * * * *